Nov. 7, 1950     R. FEITL     2,529,146
INJECTION MOLDING APPARATUS
Filed March 15, 1948
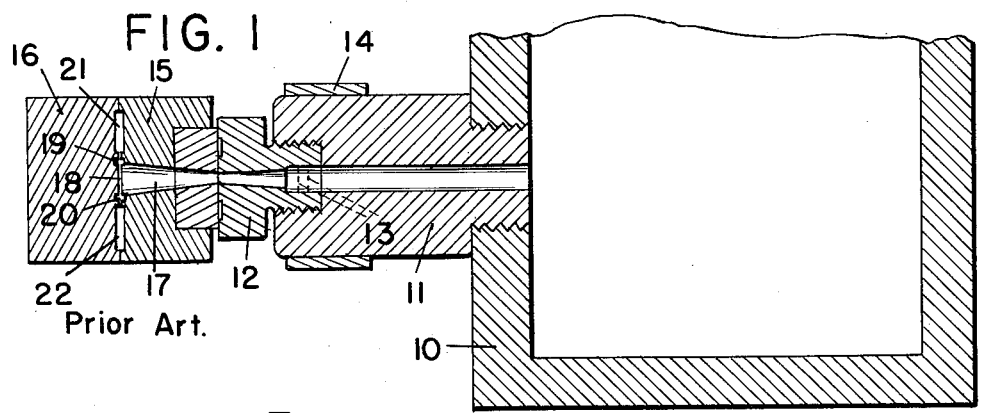
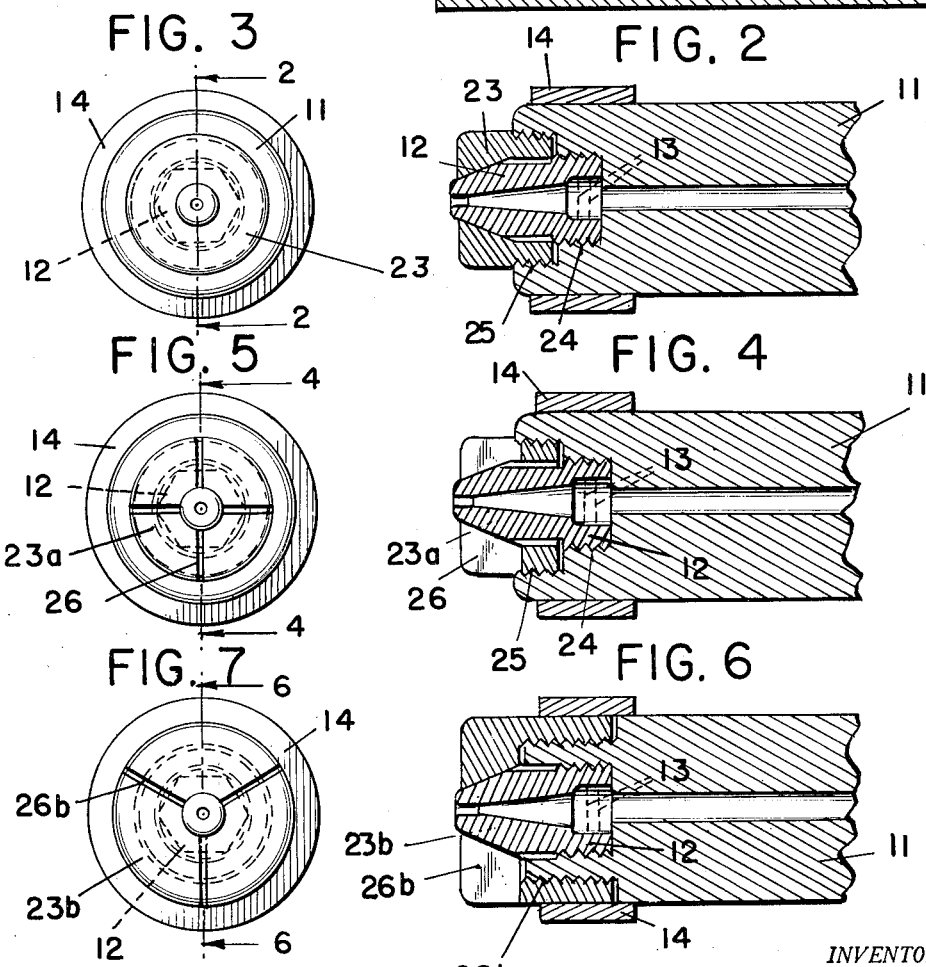
INVENTOR.
RUDOLF FEITL,
BY
ATTORNEY Patented Nov. 7, 1950

2,529,146

UNITED STATES PATENT OFFICE 2,529,146

INJECTION MOLDING APPARATUS

Rudolf Feitl, Brooklyn, N. Y., assignor to Waldes Kohinoor, Inc., Long Island City, N. Y., a corporation of New York Application March 15, 1948, Serial No. 15,013

8 Claims. (Cl. 18—30)

This invention relates to improvements in injection molding apparatus for the injection molding of small articles of thermoplastic material, particularly of the polyamide group having the trade name "nylon." In such machines, the material in pulverized form is heated in a cylinder until it melts and forms a pool in the lower end thereof. Then it is forced under high pressure from the cylinder lower part through an extension or liner to a nozzle usually secured into the end of the extension, the nozzle injecting the molten material into the entrance channel of the mold and through gates into the mold cavities wherein the articles are formed.

As the temperature at which the polyamides become molten is relatively high (520–550° F., depending on the particular type of material used), and since in order to obtain a uniform, dense and tough material, this temperature has to be maintained not only at the exit end of the nozzle but also until the molten material reaches the cavities in the mold, difficulties have arisen consequent to the obvious fact that a temperature drop in the material occurs between the lower part of the cylinder in which it is initially heated and the exit end of the nozzle, because of the cooling influence of said parts on the material and the heat loss through the surface of the liner and the nozzle body itself.

To overcome this difficulty, it is a well known and commonly used expedient to provide the liner with an electrically heated band which is disposed about the nozzle end of the liner, the band functioning to supply additional heat to the nozzle body. But even when this precaution was taken, it was found that the temperature drop between the pool of molten material in the cylinder and the material at the exit or discharge end of the nozzle still amounted to 70–80° F. for the polyamide group, the ineffectiveness of the heating band on the temperature of the nozzle being due to the low heat conductivity of the nozzle body which has to be made from hardened steel to withstand high pressure at which the molten material is extruded through the nozzle. Therefore, it became necessary, in order to insure proper temperature of the material at the nozzle, to maintain the temperature of the molten material in the cylinder approximately 70–80° F. above its melting point.

But thermoplastic materials, particularly of the polyamide group, are very sensitive to temperatures exceeding the melting point, especially when the excess of temperature is substantial. When heated substantially above the melting point, discoloration of the material in the finished article is noticeable, and the physical properties with respect to density and toughness is deteriorated, with brittleness especially being encountered, which makes the articles unfit for their intended purpose.

It has also been determined that the aforesaid difficulties grow in inverse proportions to the size of the articles being molded and therefore to the amount of material used per molding shot of the machine. The smaller the article and the smaller the amount of material per shot, the larger the cooling effect of both the liner and nozzle on the temperature of the material being fed therethrough, and consequently the larger the temperature drop between the melted pool of material in the cylinder and the material leaving the discharge end or mouth of the nozzle. Again, the smaller the amount of material per shot, both liner and nozzle must be correspondingly smaller so that it becomes impractical if not impossible to provide special heating means for the nozzle itself.

Moreover, the temperature drop occurring in the molten material as described has an adverse effect on the operating efficiency of the molding machine in two respects. First, considering the starting of the machine after its working cycle has been interrupted for a certain period of time, for example, for control purposes, the nozzle will have cooled down and the material in the nozzle may solidify to the extent that it takes a relatively long time and a relatively high temperature to start a new cycle. Secondly, any article to be molded has a sprue molded with it which is later removed. When a series of very small articles such as slide fastener elements are to be molded simultaneously in one row or in double rows in one shot of the machine, such small articles are connected by a gate which is also later removed in a cutting off operation. The aforesaid sprue and the gate material represent a relatively large amount of material which would be a total loss unless capable of re-use. And when such material for re-use must again be heated to a temperature which considerably exceeds its melting point, then deterioration sets in as explained above, which condition substantially limits any considerable re-use of the material of the sprue and gates.

With the above in mind, a main object of this invention is the provision of a nozzle construction for injection molding machines for the injection molding of small articles of thermoplastic material, particularly of the polyamide (nylon) group, which is so constructed and designed as to preclude any substantial drop in temperature between the molten material in the lower part of the melting cylinder and that leaving the mouth of the nozzle and being fed into the mold.

A further object of the invention is to provide, for use in an injection molding machine as aforesaid, a nozzle construction characterized by a nozzle member made from material of high strength which is capable of withstanding the exceedingly high molding pressure to which it is exposed without permanent deformation, and an outer part surrounding the nozzle member made from material of high thermal conductivity and which is so arranged as to provide a heat-conductive path or link through which heat produced by the heating band encircling the nozzle end of the liner is transmitted to the nozzle tip or mouth portion.

Still another object of the invention is the provision of a compound nozzle for injection molding machines as last stated, in which the outer part of the nozzle consisting of material of high thermal conductivity is capable of limited yielding movement, whereby differences in thermal expansion of inner nozzle body and outer encircling part does not interfere with the intended cooperation of said parts, i. e. a tight fit of outer part on nozzle body, which must be maintained constant to secure the desirable high nozzle temperature.

The above and other objects and features of advantage of the invention will be understood from the following detailed description thereof, taken with the accompanying drawing, in which:

Fig. 1 is a somewhat diagrammatic sectional side view of a known nozzle arrangement for an injection molding machine for molding articles from thermoplastic material having a high melting point;

Fig. 2 is a longitudinal section of one embodiment of the improved nozzle construction according to this invention;

Fig. 3 a front view of the nozzle construction shown in Fig. 2;

Fig. 4 is a longitudinal section of another embodiment of nozzle construction according to the invention;

Fig. 5 is a front view of the nozzle construction illustrated in Fig. 4; and

Figs. 6 and 7 are longitudinal sectional and front views of another embodiment of nozzle construction according to the invention.

Referring to Fig. 1, illustrating in diagrammatic sectional view the conventional injection molding machine, and more particularly the known type of nozzle used therewith, reference numeral 10 designates a heated cylinder in the lower part of which the thermoplastic material initially in pulverized form is melted. The melted material is forced under high pressure through liner 11 into nozzle 12, passing through perforated plates or screens 13 for better distribution. At its nozzle end the liner 11 is provided with an encircling heating band 14 functioning to supply heat to the nozzle for the purpose of maintaining the material passing through the same at the temperature to which it has been heated in the cylinder 10. The nozzle 12 injects the heated material into the fixed mold part 15 relative to which mold part 16 is horizontally movable, the material flowing through sprue passage 17 in the fixed mold part to gate 18, from whence it is forced into the cavities 19, 20 for the articles to be molded which for purpose of illustration are slide fastener elements. Recesses 21, 22 formed in the contiguous faces of the mold parts are adapted to receive the tapes to which the slide fastener elements are affixed.

According to the invention, the nozzle member 12 which as heretofore is made from material of high strength such as hardened steel, is surrounded by an outer member or part 23 made from a material having high thermal conductivity. For best results and proper functioning, the outer member 23 is positioned intermediate the outer end portion of the liner which is heated by the heating band 14 and the nozzle member 12, and may be made from copper.

A preferred mounting of the nozzle and outer members in the liner is illustrated in Figs. 2 and 4, wherein the inner end of the nozzle member is shown to be formed as a cylindrical plug secured into a bore opening through the end face of the liner and which is provided with internal threads 24. The outer member 23 has a cylindrical end which terminates radially inwardly of the heating band 14 and which is threaded into a counterbore, also formed in the end face of the liner and provided with internal threads 25. Accordingly, the nozzle member 12 and its outer member 23 are in effect separately affixed to the liner by their own threads, of which the threads 24 take up the heavy pressure of the material in the nozzle member proper, so that the outer member is under little if any strain.

To provide for a tight fit of the nozzle member in its outer member 23, the protruding or tip end of the nozzle member is preferably formed as a truncated cone, and the inner bore surface of the outer member is complementally shaped. Hence, as the outer member 23 is screwed into the liner 11, the complemental cone faces of outer and nozzle members engage with a tight pressure contact.

With the above described nozzle construction, it will be observed that outer member 23 is directly influenced by the heat supplied by the heating band 14 to the nozzle end of the liner, and, being made from metal having high conductivity, it in effect forms a heat link between the heating band 14 and the nozzle member 12, with tight pressure contact of outer member on nozzle member further insuring transference of heat to the nozzle member, particularly at the exit or mouth end thereof. Due to the heat supplied to the nozzle member, the temperature of the molten material being forced through the same is maintained substantially the same as the temperature of the material in the container 10, which temperature may be held substantially at the melting point of the material.

In the embodiment illustrated in Figs. 4 and 5, the nozzle member is provided with an outer member 23a of heat-conductive material similar to that illustrated in Fig. 2. However, the outer or free end of the outer member is provided with saw-cuts or slots 26 which impart resiliency to the portion of the outer member in pressure contact with the tip or discharge end of the nozzle member. This is a feature of advantage when it is considered that the nozzle and outer members may expand by different amounts under the influence of heat, with the provision of the slots insuring tight fit of the outer member on nozzle member tip, even under conditions of different degrees of expansion thereof.

In the embodiment illustrated in Figs. 6 and 7, the outer member 23b is formed with a cylindrical skirt which encircles the outer or nozzle end of the liner 11, which latter in this case has its end reduced and externally threaded as at 28b. The outer diameter of the skirted portion of the outer member 23b is the same as that of the body of the liner 11, so that the nozzle outer member extends flush with the outer surface of the liner. It will also be observed that the cylindrical skirt of the nozzle outer member extends substantially beneath the heating band 14, so that a highly conductive path of metal is provided between said band and the tip end of the nozzle member. The nozzle outer member 23b is moreover provided with slots 26b for the purpose of imparting resilience thereto, whereby the nozzle and outer members may expand differently when heated and at the same time maintain a tight pressure contact.

Without further analysis, it will be appreciated that the present invention provides an extremely simple yet effective means for maintaining high temperature in the nozzle of an injection molding machine designed for the molding of thermoplastic articles. By proper proportioning of the parts as well as the selection of the material making up the improved nozzle construction, the temperature drop in the plastic material between the container in which it is melted and its point of emergence from the nozzle is substantially eliminated, with the result that the material need not be initially heated to temperatures substantially in excess of the temperature at which it becomes molten. Hence, a noticeable improvement in the molded articles is obtained, both as respects properties of color, density and toughness. The nozzle construction of the invention has the further advantage that it maintains the material then within the nozzle in its molten state during intervals when the working cycle is interrupted, thus facilitating the starting of a new cycle. It also increases the operating efficiency of the injection molding machine as a whole, due to the fact that the molded sprue and the gate cut away from the molded articles can be re-melted to the average temperature at which they become molten without deterioration rather than to temperatures substantially in excess of the melting temperature as heretofore required. Hence, by permitting re-use of the sprue and gate material, the improved nozzle construction results in a substantial saving in the amount of thermoplastic material that is required for a particular molding operation.

As many changes could be made in carrying out the above construction without departing from the scope of the invention, it is intended that all matter contained in the above description or shown in the accompanying drawings shall be interpreted as illustrative and not in a limiting sense.

I claim:

1. In an injection molding machine in which molten material is supplied under high pressure to a mold through a liner and a nozzle affixed in and extending from the end of the liner, the liner carrying means for supplying heat to the nozzle, a nozzle construction comprising an inner nozzle member made from high strength material, and an outer member made from material of high thermal conductivity disposed in encircling relation about the inner nozzle member, and providing a path of heat transfer from the heat supplying means to said inner nozzle member the inner ends of said nozzle and outer members being separately affixed to the liner, and the inner end of the outer member terminating radially inwardly of the heating means.

2. In an injection molding machine in which molten material is supplied under high pressure to a mold through a liner and a nozzle affixed in and extending from the end of the liner, the liner carrying means for supplying heat to the nozzle, a nozzle construction comprising an inner nozzle member made from high strength material, and an outer member made from material of high thermal conductivity disposed in encircling relation about the inner nozzle member, one end of the outer member extending well into the liner and terminating radially inwardly of the heating means, and the other end embracing and having by pressure contact with the extending end of the nozzle member.

3. A nozzle construction for an injection molding machine as set forth in claim 1, wherein said nozzle and outer members are each separately screw-threaded into the liner, the arrangement being such that the pressure exerted by the material on the inner nozzle member is taken up substantially exclusively by the threads which connect it to the liner.

4. A nozzle construction for an injection molding machine as set forth in claim 2, wherein said other end of the outer member is provided with axially extending radial slots which impart resiliency thereto and insure a tight pressure fit of outer member on the extending end of the nozzle member under conditions of different thermal expansion of said members when heated.

5. A nozzle construction for an injection molding machine as set forth in claim 2, wherein the outer surface of the extending end of the nozzle member is conical and the inner surface of the outer member is formed as a congruent cone.

6. A nozzle construction for an injection molding machine as set forth in claim 2, wherein the outer surface of the extending end of the nozzle member is conical and the inner surface of the outer member is formed as a congruent cone, and wherein the outer end of the outer member is provided with axially extending radial slots which impart resiliency to said outer end.

7. In an injection molding machine in which molten material is supplied under high pressure to a mold through a liner and a nozzle affixed in and extending from the end of the liner, the liner carrying means for supplying heat to the nozzle, a nozzle construction comprising an inner nozzle member made from high strength material having one end screw-threaded into a bore provided in the end of the liner and its other end formed as a conical tip extending beyond the end of the liner, and an outer member made from material of high thermal conductivity disposed in encircling relation about the nozzle member, the outer member having one end screw-threaded into a counter bore provided in the liner end so as to radially underlie the heating means and its other end disposed about and having surface contact on the conical tip of the nozzle member.

8. In an injection molding machine in which molten material is supplied under high pressure to a mold through a liner and a nozzle affixed in and extending from the end of the liner, the liner carrying means for supplying heat to the nozzle, a nozzle construction comprising an inner nozzle member made from high strength material and having one end screw-threaded into a bore provided in the end of the liner and its other end formed as a conical tip which extends beyond the end of the liner, and an outer member made from material of high thermal conductivity disposed in encircling relation about the nozzle member, said outer member having a cylindrical skirt at one end which extends over the nozzle end of the liner and underlies the nozzle heating means, the other end of the outer member being disposed about and having surface contact on the conical tip of the nozzle member.

RUDOLF FEITL.

REFERENCES CITED

The following references are of record in the file of this patent:

UNITED STATES PATENTS

| Number | Name | Date |
|---|---|---|
| 2,033,735 | Pack | Mar. 10, 1936 |
| 2,308,867 | Dinzl | Jan. 19, 1943 |
| 2,456,423 | Jobst | Dec. 14, 1948 |